Oct. 4, 1927.
H. G. SMITH
1,644,547
WIND INDICATOR FOR NIGHT AVIATION
Filed May 24, 1924
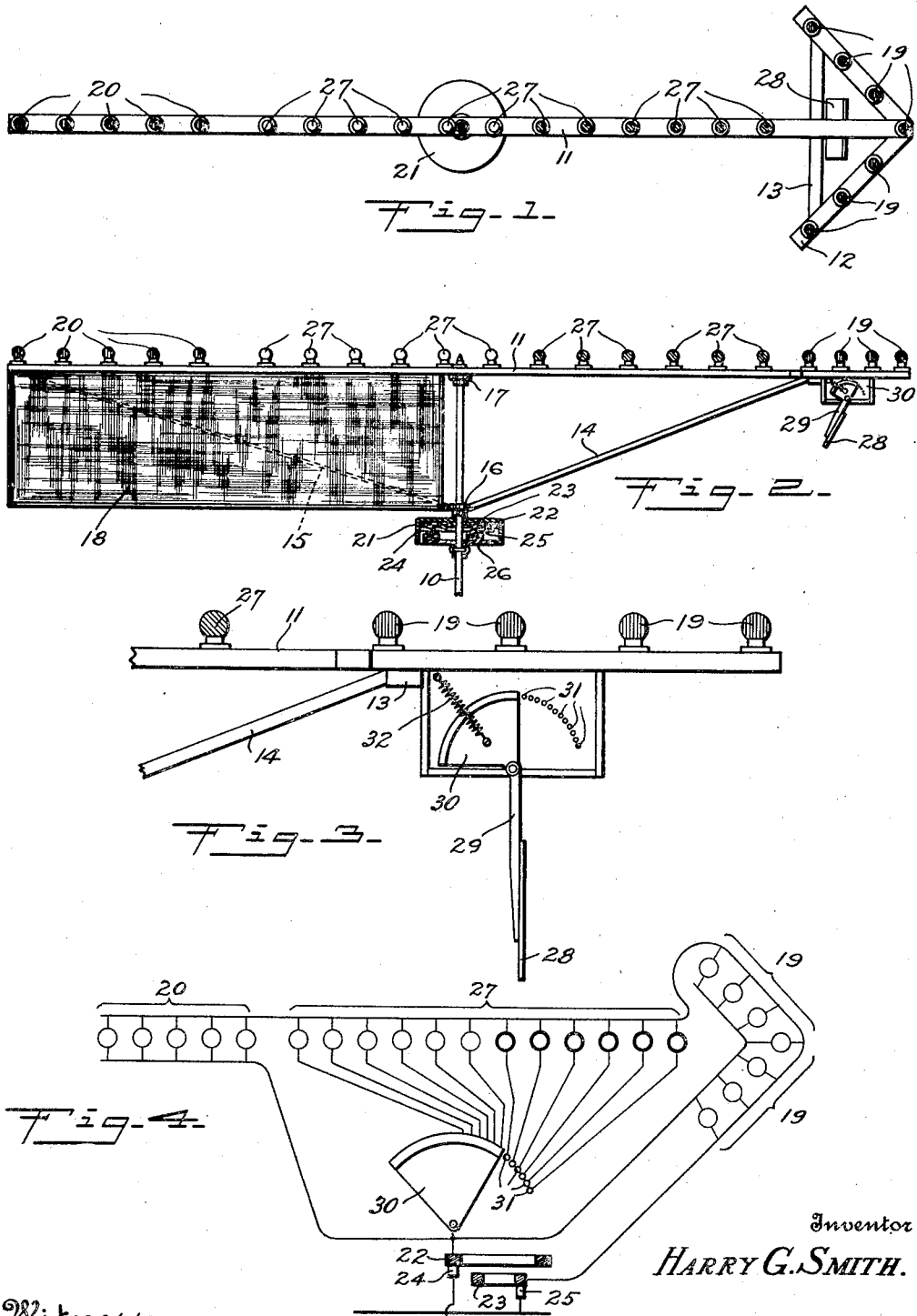

Patented Oct. 4, 1927.

1,644,547

UNITED STATES PATENT OFFICE.

HARRY G. SMITH, OF OMAHA, NEBRASKA.

WIND INDICATOR FOR NIGHT AVIATION.

Application filed May 24, 1924. Serial No. 715,755.

My invention relates to means for indicating the direction and velocity of wind. It is the object of my invention to provide an indicator or automatic signalling mechanism for use on aviation landing-fields at night, adapted to be clearly observed from a considerable distance or height, and to indicate to the observer the direction and velocity of the wind at the landing surface. Various means have been heretofore employed for indicating the direction of the wind on a landing-field, some of such devices being manually operated or controlled, and being indirectly illuminated. The means commonly employed for indicating wind-velocity consists of a "wind-cone" suspended so as to hang vertically in a calm and to swing out to inclined positions of which the angle to the vertical increases according to the wind-velocity. For night-flying the same indicating means have been employed as in the daytime, the wind-cone being illuminated by directing a spotlight or small searchlight thereon. Such wind-indicating means have proven to be very unsatisfactory in practice, partly because of the low visibility, and also because the position of the wind-cone cannot be accurately judged, even in daytime, except when viewed from a direction crosswise of the wind. My invention provides a directly illuminated indicating means, wherein the position of a number of light-sources serves to show the wind-direction, and the number or relative extent of other light-sources, arranged in definite relation to the direction-indicating lights, shows the wind-velocity; the entire indicator being so designed and arranged that it may be clearly observed and its indications correctly interpreted by an aviator approaching the landing-field from any direction, and while at a sufficient height or distance to facilitate any maneuvers required to effect a safe landing under the prevailing wind-conditions indicated.

In the accompanying drawings Fig. 1 is a plan view of a wind indicator embodying my invention, Fig. 2 is a side view of the same, Fig. 3 is a detail side view of the controlling device for the velocity-indicating means, and Fig. 4 is a diagram of the electrical circuits.

In the illustrated structure there is provided a vertical staff or mast 10, on which is revolubly supported a large vane having a horizontal upper frame-bar 11 to which are secured the head-pieces 12, the latter diverging laterally in a horizontal plane to resemble the barbs of an arrow-head, and the outer or rear ends of the head-pieces being connected by a cross-bar 13. Diagonal brace-bars 14 and 15 extend from points near the front and rear ends, respectively, of the bar 11, to a lower bearing-ring 16 through which the supporting mast extends, and a similar bearing-ring 17 is arranged at the center of the bar 11 about the upper end of the mast. Beneath the rear portion of the bar 11 is carried the vertical fin or tail-piece 18 which may consist of a rectangular frame covered with fabric. Suitable anti-friction bearings, not shown in detail, are arranged in the rings 16 and 17, and the vane as a whole is so proportioned as to balance at the pivotal axis, whereby to be freely swingable and to enable the wind-pressures upon the tail-piece 18 to keep the head 12 pointed into the wind. Upon the head-pieces 12 are mounted a number of electric incandescent lamps 19, preferably having a distinctive coloration, such as red, and a series of similar lamps 20 are mounted upon the rear portion of the frame-bar 11. Said lamps 19 and 20 are connected with a suitable source of electrical energy, so as to be continuously lighted during such times as the indicator may be needed. In the structure shown, there is provided a cylindrical housing 21 which is secured to the lower bearing-ring 16 so as to rotate with the vane. In said housing are disposed a pair of insulated collector-rings 22 and 23, which are engaged by brushes 24 and 25 carried on a plate 26 secured to the mast beneath the housing. Current delivered to the brushes from a supply circuit is transmitted to the collector-rings at all positions of the vane, and said rings are connected with the lamps by suitable wiring, such as represented in Fig. 4.

On the intermediate portion of the vane are arranged a series of electric lamps 27, preferably of a color different from the lamps 19 and 20 at the head and tail of the vane. The lamps 27 are employed for indicating the velocity of the wind, and are arranged to be lighted successively, commencing at one end of the row or series, an additional lamp being lighted at each increment of a predetermined amount in the velocity, or extinguished when there is a corresponding decrease in the force of the wind For automatically controlling the lamps 27 there is provided, in the structure shown, a pendulum anemometer of which the structure and mode of operation will be clearly apparent from Fig. 3. Beneath the head of the vane is arranged a flat blade or plate 28 which is carried by an arm 29 pivoted on a horizontal axis extending transversely of the vane. A vertical sector-plate 30 is secured to the arm 29, extending upwardly from the pivotal axis, and being movable to engage a series of contacts 31. A spring 32 connected with the sector-plate 30 tends to hold the arm 29 and plate 28 in a vertical position, from which they are movable to inclined positions by the force of the wind against the front side of the plate. The contacts 31 are connected electrically with the lamps 27, as represented in Fig. 4, and the sector-plate is connected with the collector-ring 22, so that as the sector-plate swings to engage the contacts, the circuits through the respective lamps will be closed and the lamps lighted, or as the plate swings in the opposite direction the circuits will be successively opened and the lamps extinguished. By suitably proportioning the parts, as the plate 28 is moved to various angles by the wind-pressure thereon, the sector-plate will engage the successive contacts 31 at intervals corresponding to definite variations of the wind-velocity, and the velocity at any moment will therefore be indicated by the number of the lamps 27 which are then lighted.

From the foregoing it will be apparent that my invention provides a means by which the wind-conditions affecting the landing of aircraft may be correctly and constantly indicated at night in such a manner as to be readily observed from such heights and distances as to insure safe landing. The lamps 19, 20 and 27, being original sources of light, can be more easily and distinctly observed at a distance than any body or object illuminated indirectly or by reflection of light from another source. The color and distinctive arrangement of the constantly lighted lamps 19 and 20 are such that the same may be easily distinguished from other lights in the vicinity, and the head and tail groups distinguished from each other. Said lamps 19 and 20 also serve as reference-points from which the proportionate number of the lamps 27 which are lighted may be estimated. It should be noted that when seen from a distance the lamps 19 will appear blended into a luminous V-shaped figure, while the lamps 20 will appear as a luminous line or bar, spaced from the V-shaped figure and alined with the axis of symmetry thereof. Similarly, the lamps 27 will appear as a luminous line or bar of which the length will vary according to the wind-velocity, and as the positions of the head and tail groups serve to indicate the limits of the velocity-indicating line, the relative length of the luminous part may be conveniently estimated. As the vane is freely swingable, irregular and rapidly varying winds will cause the vane to swing or oscillate about its axis, and such swinging movements will thus indicate the variability of direction while continuing to show the general trend of the air-currents. Similarly, a wind which is gusty or of rapidly varying velocity will be indicated by shortening and lengthening of the luminous line formed by the lamps 27. As the vane moves in a horizontal plane, and in practice would be disposed near the ground, it may be readily observed and its indications correctly interpreted, regardless of the direction from which it is viewed; and any foreshortening, due to observation of the vane at an angle and while it is directed toward or from the observer, will be automatically discounted because of the fact that the estimate of wind-velocity will be based upon the relative or proportionate length of the space illuminated intermediate the head and tail groups of lamps, and such relation or proportion will be the same no matter what may be the apparent length of the vane resulting from the angle at which it is viewed.

Now, having described my invention, what I claim and desire to secure by Letters Patent is:

1. Means for indicating wind-velocities upon aviation landing-fields, comprising a support, two groups of lamps arranged in spaced relation upon said support, a linear series of lamps extending intermediate said spaced groups, and controlling means for said intermediate lamps adapted to light and extinguish the same successively according to increase and decrease of wind velocity.

2. Means for indicating wind-velocities to facilitate night-landing of aircraft, comprising a support, two groups of lamps arranged in spaced relation upon said support, a linear series of lamps arranged upon the support intermediate said spaced groups, an anemometer, and means actuated thereby for automatically lighting and extinguishing said intermediate lamps successively according to increase and decrease of wind velocity.

3. Means for indicating wind-conditions upon aviation landing-fields at night, comprising a support movable rotatively in a horizontal plane, two groups of lamps mounted in spaced relation upon said support and arranged in distinctive linear formations, a series of lamps arranged to extend longitudinally between said spaced groups, and means for severally controlling the lamps of the longitudinal series, whereby the same may be lighted and extinguished to form a luminous line of variable length and proportions relative to the distance between the spaced groups of lamps.

4. A wind-indicator for night aviation, comprising a vane mounted to swing about a vertical axis, lamps mounted upon the head and tail portions of said vane and arranged in distinctive linear formations, a series of lamps arranged intermediate the head and tail groups, and controlling means for said intermediate lamps adapted to light and extinguish the same successively according to increase and decrease of wind velocity.

5. A wind-indicator for the purposes described, comprising a vane mounted to swing about a vertical axis, lamps mounted upon the head and tail portions of the vane and arranged in distinctive formations, a series of lamps extending longitudinally intermediate the head and tails groups, electric circuits for said lamps, an anemometer, and a switch mechanism controlled thereby and controlling the electric circuits for the lamps of the intermediate series.

6. A wind-indicator for the purposes described, comprising a vane mounted to swing in a horizontal plane, means for illuminating constantly the head and tail portions of the vane, illuminating means for the intermediate portions of the vane, an anemometer, and means actuated thereby for controlling the illuminating means for said intermediate portions of the vane.

HARRY G. SMITH.